(12) United States Patent
Kamikawa

(10) Patent No.: US 6,679,570 B2
(45) Date of Patent: Jan. 20, 2004

(54) TRACK FRAME STRUCTURE

(75) Inventor: Shinobu Kamikawa, Komatsu (JP)

(73) Assignee: Komatsu Ltd. (JP)

( * ) Notice: Subject to any disclaimer, the term of this patent is extended or adjusted under 35 U.S.C. 154(b) by 22 days.

(21) Appl. No.: 10/078,514

(22) Filed: Feb. 21, 2002

(65) Prior Publication Data

US 2002/0124439 A1 Sep. 12, 2002

(51) Int. Cl.[7] .............................................. B62D 55/30
(52) U.S. Cl. ..................................... 305/145; 180/9.44
(58) Field of Search .................. 37/301, 302; 305/144, 305/143, 145, 129, 132, 124, 125; 180/9.1, 9.21, 9.26, 9.44, 9.46

(56) References Cited

U.S. PATENT DOCUMENTS

| | | | | |
|---|---|---|---|---|
| 3,741,331 A | * | 6/1973 | Kowalik ..................... | 180/9.44 |
| 3,787,097 A | * | 1/1974 | Orr .............................. | 305/145 |
| 4,068,732 A | * | 1/1978 | Granryd ...................... | 180/6.7 |
| 4,283,093 A | * | 8/1981 | Cline .......................... | 305/147 |
| 4,413,862 A | * | 11/1983 | Ragon ........................ | 305/146 |
| RE36,284 E | * | 8/1999 | Kelderman ................. | 305/129 |
| 6,431,665 B1 | * | 8/2002 | Banerjee et al. ........... | 305/144 |

FOREIGN PATENT DOCUMENTS

JP          9-142343          6/1997

* cited by examiner

Primary Examiner—Robert E. Pezzuto
(74) Attorney, Agent, or Firm—Rader, Fishman & Grauer PLLC

(57) ABSTRACT

A track frame structure which can increase a crawler actual ground contact length (L0) from a first track roller to an endmost track roller without increasing a whole length of a traveling apparatus. A notch portion (2a) having a size not contacting with an endmost track roller (6r) is formed in a portion facing to the track roller (6r) in a side of a crawler drive wheel (8) of a joint plate (2) provided so as to close one end portion in a longitudinal direction of a track frame (1), and the endmost track roller (6r) is arranged close to a side of the crawler drive wheel (8) so that the endmost track roller (6r) faces to an inner side of the notch portion (2a). A side portion of the notch portion (2a) in a joint plate (2A) is bent toward the crawler drive wheel (8).

2 Claims, 5 Drawing Sheets

TRACK FRAME STRUCTURE

BACKGROUND OF THE INVENTION

1. Field of the Invention

The present invention relates to a track frame structure of a crawler-type construction machine.

2. Description of Prior Art

As shown in FIGS. 7 and 8, as a traveling apparatus of a crawler-type construction machine such as a bulldozer, a hydraulic excavator and the like, there is a hydraulically driven type crawler traveling apparatus in which a mounting frame assembly (constituted by a bracket or the like) 3B of a crawler drive reduction gear 11 with a hydraulic motor is integrally connected to a rear end side of a track frame 1B for a crawler via a joint plate 2B, the crawler drive reduction gear 11 with the hydraulic motor is mounted, and a sprocket 15 mounted to a crawler drive wheel 8 provided in the crawler drive reduction gear 11 is engaged with a crawler 14, thereby rotating the crawler 14 due to a hydraulic drive force so as to travel.

Since the hydraulically driven type crawler traveling apparatus mentioned above is provided with the joint plate 2B integrally connecting the mounting frame assembly 3B of the crawler drive reduction gear 11 with the hydraulic motor, in the rear end side of the crawler track frame 1B, it is impossible to move a mounting position of a track roller 6r mounted to a rearrest end side of the track frame 1B close to a side of the crawler drive wheel 8, so that there is a problem that a crawler actual ground contact length between the track roller 6r and a track roller 6f mounted to a frontmost end side of the track frame 1B is shorter than a normal mechanical drive type crawler traveling apparatus.

The actual ground contact length means a length L0 in which the crawler 14 is actually in contact with the ground between the track roller 6f at the frontmost end of the track frame 1B and the track roller 6r at the rearmost end of the track frame 1B, as shown in FIG. 7, however, when the actual ground contact length L0 is short, a stability in a longitudinal direction of a vehicle body is reduced, and an angle of incline in the longitudinal direction of the vehicle body is increased at a time when the crawler 14 runs on a protruding object, whereby a fluctuation of height of a working implement such as a blade or the like from the ground is increased, so that there is generated a problem that a ground leveling operability is not good.

As an improvement against the problem mentioned above, there is a structure disclosed in Japanese Patent Application Laid-open No. 9(1997)-142343, however, it can not provide a track frame structure capable of making the crawler actual ground contact length longer.

SUMMARY OF THE INVENTION

The present invention is made for the purpose of solving the problem mentioned above, and an object of the present invention is to provide a track frame structure in which a track roller at a rearmost end side of the track frame can be mounted without being interfered with a joint plate so as to increase a crawler actual ground contact length.

In order to achieve the object mentioned above, in accordance with a first aspect of the present invention, there is provided a track frame structure in which a mounting frame assembly of a crawler drive reduction gear with a hydraulic motor is mounted to an end portion of a track frame 1 of a crawler-type construction machine via a joint plate 2, wherein a notch portion, notched so as to have a size to which a roller portion of a track roller is inserted, is provided in a lower side plate portion of the joint plate, and a roller portion of a track roller mounted to a rearmost end side of the track frame is inserted and mounted within the notch portion, whereby the track roller in the rearmost end side of the track frame can be arranged close to a crawler drive wheel side.

In accordance with the first aspect of the present invention, since the structure is made such that the roller portion of the track roller mounted to the rearmost end side of the track frame can be inserted and mounted within the notch portion formed in the joint plate, it is possible to move the track roller in the rearmost end side of the track frame close to the crawler drive wheel side.

Accordingly, it is possible to increase the crawler actual ground contact length and it is possible to improve stability and a ground leveling operability at a time when the vehicle travels and works.

In accordance with a second aspect of the present invention, there is provided a track frame structure as recited in the first aspect, wherein the lower side plate portion having the notch portion notched so as to have the size to which the roller portion of the track roller is inserted in the joint plate is constituted by a joint plate formed by bending to a side of the crawler drive wheel, the roller portion of the track roller mounted to the rearmost end side of the track frame is inserted within the notch portion, and a rotary shaft receiving portion of the track roller is mounted close to a bent side of the joint plate, whereby the track roller in the rearmost end side of the track frame can be arranged close to the crawler drive wheel side.

In accordance with the second aspect of the present invention, it is possible to increase a length of the rear end side in a lower surface of the track frame toward a rearward portion by bending the lower side of the joint plate, and it is possible to move a mounting position of a track roller bearing mounted to the lower surface in the rearmost end side of the track frame further close to the crawler drive wheel side.

Further, the notch portion to which the roller portion of the track roller is inserted is formed in the plate bent portion, whereby it is possible to move the track roller in the rearmost end side of the track frame further close to the crawler drive wheel side so as to make the crawler actual ground contact length longer in comparison with the first aspect, and it is possible to further improve the traveling stability and the ground leveling operability of the vehicle.

DESCRIPTION OF THE PREFERRED EMBODIMENTS

Figure 1:
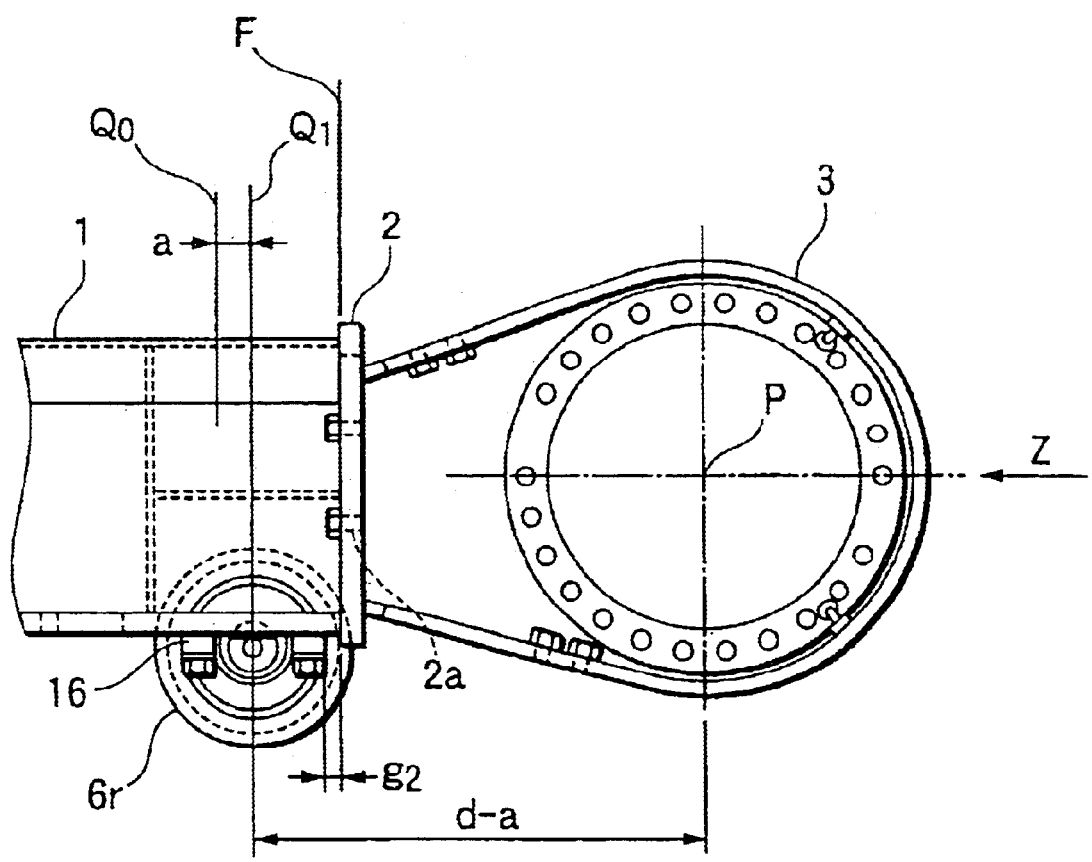
FIG. 1 is a view showing a track frame end portion in accordance with a first embodiment.

A description will be given below of embodiments in accordance with the present invention with reference to FIGS. 1 to 6. In this case, in FIGS. 1 to 6, elements having the same reference numerals as those in FIGS. 7 and 8 denote the same parts or the same functioning parts, and a description thereof will be omitted.

Figure 2:
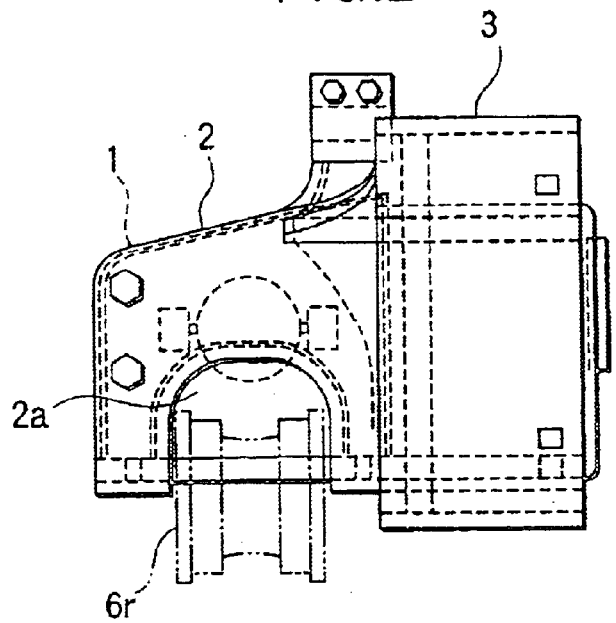
FIG. 2 is a view as seen from an arrow Z in FIG. 1.

At first, a description will be given of a first embodiment with reference to FIGS. 1 to 3. FIG. 1 is a schematic view of a main portion of the present invention, which shows a rear end portion of a track frame 1. FIG. 2 is a view as seen from an arrow Z in FIG. 1, and FIG. 3 is a side elevational view of a traveling apparatus in accordance with the present embodiment.

Figure 3:
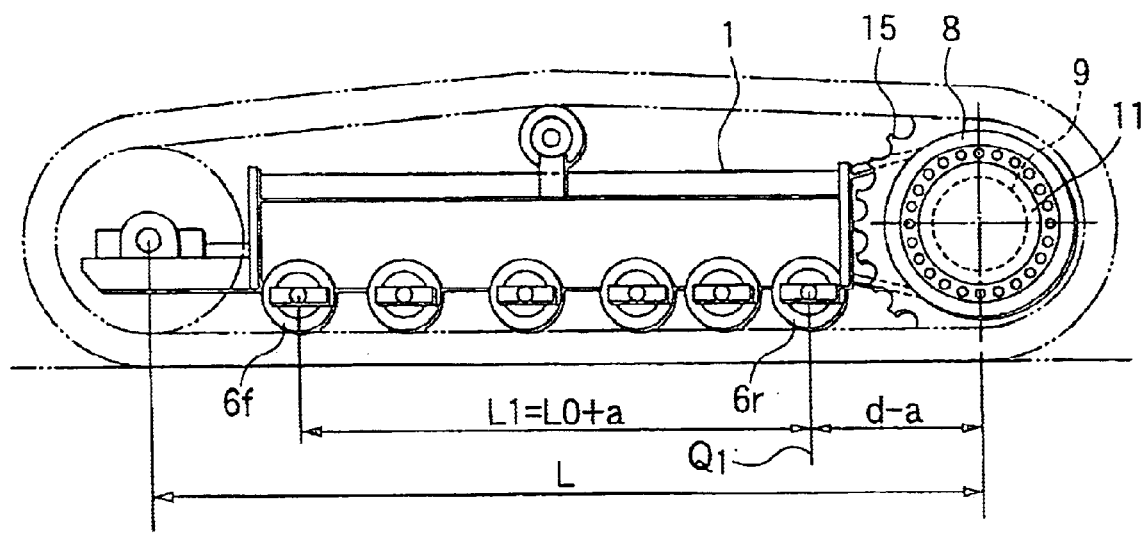
FIG. 3 is a side elevational view of a traveling apparatus in accordance with the first embodiment.

In a traveling apparatus rotating a crawler by a drive reduction gear 11 with a hydraulic motor, as shown in FIGS. 1 and 3, a mounting frame assembly 3 for mounting the drive reduction gear 11 with the hydraulic motor to a rear end side of the track frame 1 constituting the traveling apparatus is adhered by a joint plate 2 so as to be integrally provided.

The drive reduction gear 11 with the hydraulic motor is rotatably provided with a crawler drive wheel 8 having a gear 15 engaging with a crawler (not shown), and is detachably fitted to a window hole of the mounting frame assembly 3 so as to be mounted thereto.

The joint plate 2 is provided with a notch portion 2a in a lower side plate portion facing to a track roller 6r in a rearmost end side of the track frame 1, for the purpose of capable of mounting the crawler roller 6r to a position close to a side of the crawler drive wheel 8. The notch portion 2a corresponds to a notch space notched so as to have a size of a roller portion of the track roller 6r, and is formed so as to have a size in which the roller portion is inserted within the notch space.

The track roller 6r is mounted to a frame lower surface portion in the rearmost end side of the track frame 1 by a rotary bearing portion 16 at a position at which one roller portion in a radial direction is inserted within the notch portion 2a notched in the joint plate 2.

Next, a description will be given of an operation and an effect of the first embodiment with reference to FIGS. 1 to 3.

As shown in FIGS. 1 and 2, since the notch portion 2a to which the roller portion of the track roller 6r in the rearmost end of the track frame 1 is inserted is formed in the joint plate 2, it is possible to move the mounting position of the track roller 6r close to the side of the crawler drive wheel 8 by inserting the roller portion of the track roller 6r within the notch portion 2a.

The movement at this time makes it possible to move the track roller 6r to the side of the crawler drive wheel with at least a predetermined gap g2 between an end surface F in the side of the track frame of the joint plate 2 and a bearing 16 of the track roller 6r, and it is possible to arrange a position of a rotary bearing center Q0 of the track roller 6r in accordance with the conventional art at a position of a rotary bearing center Q1 which is moved to the side of the crawler drive wheel at an illustrated length a.

Figure 7:
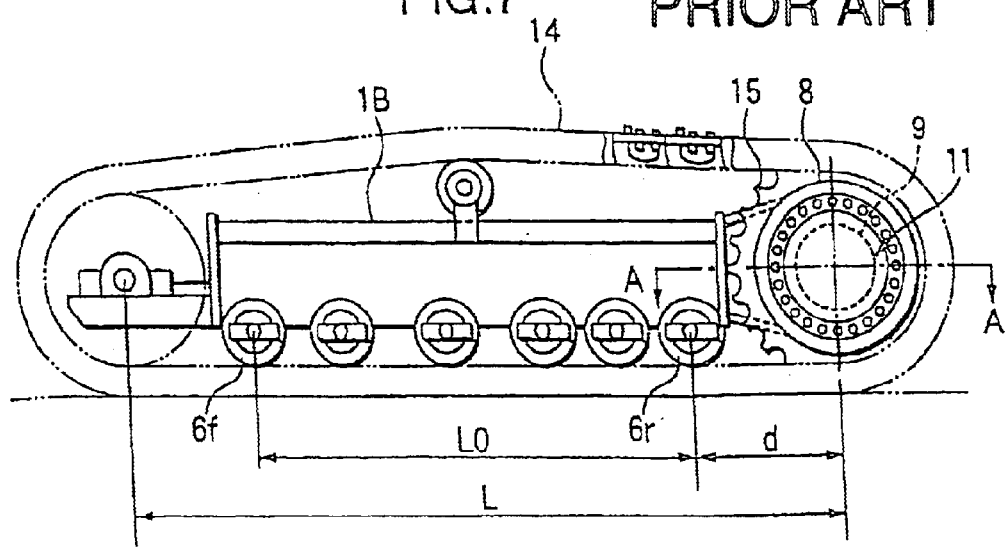
FIG. 7 is a side elevational view of a traveling apparatus in accordance with a conventional art.
Figure 8:
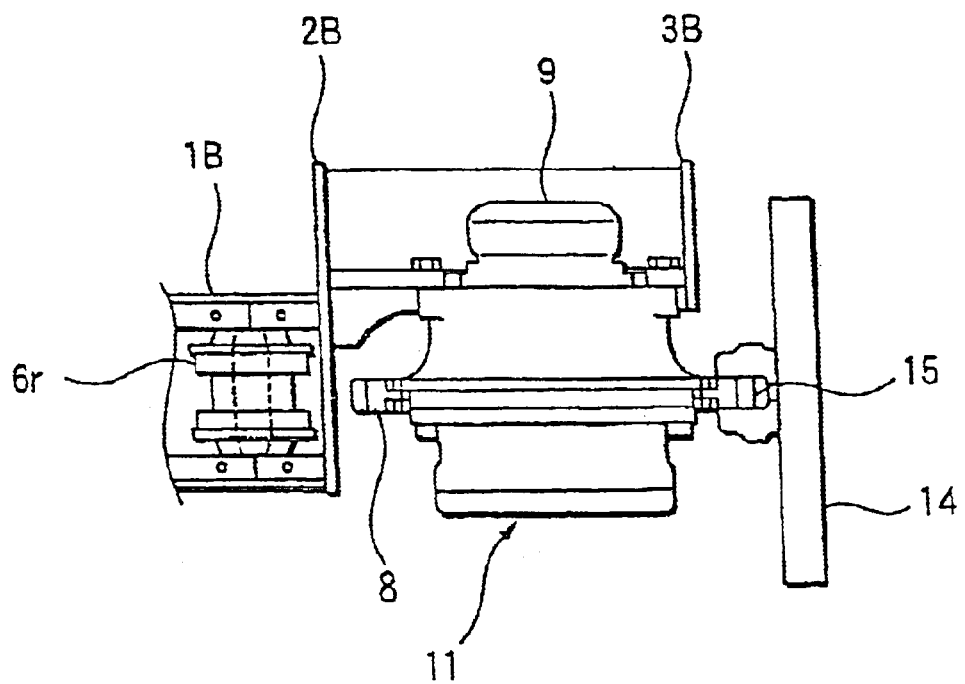
FIG. 8 is a cross sectional view along a line A—A in FIG. 7.

Accordingly, with respect to a distance d between the rotary bearing center Q0 of the track roller 6r at the rearmost end in accordance with the conventional art shown in FIG. 7 and a center P of rotation of the crawler drive wheel, a distance between the rotary bearing center Q1 of the track roller 6r at the rearmost end in accordance with the present embodiment and the center P of rotation of the crawler drive wheel is set to d-a, so that the length a can be shortened.

Accordingly, as shown in FIG. 3, a crawler actual ground contact length L1 between the rotary bearing center of the track roller 6f in the rearmost end side of the track frame and the rotary bearing center Q1 of the track roller 6r in the rearmost end side of the track frame is obtained by a formula L1=(L0+a), so that it is possible to increase a magnitude of the crawler actual ground contact length in the hydraulic drive type crawler traveling apparatus in comparison with the conventional one, and it is possible to improve a stability and a ground leveling operability at a time of traveling and working.

Figure 4:
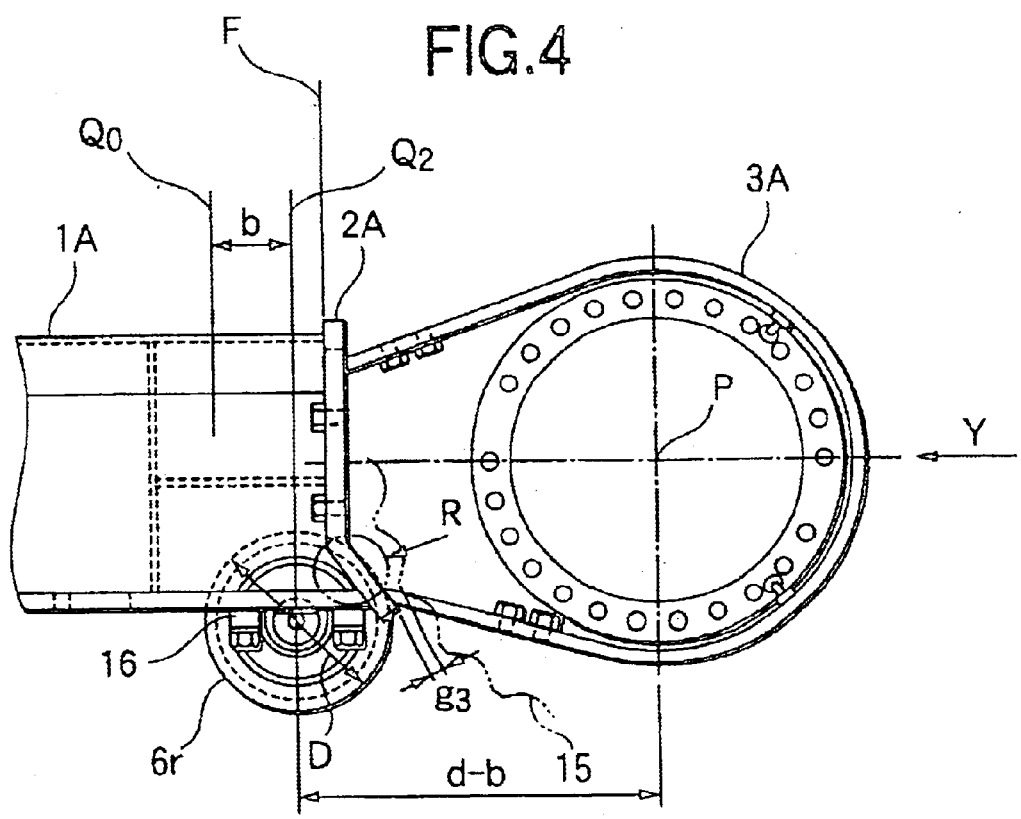
FIG. 4 is a view showing a track frame end portion in accordance with a second embodiment.
Figure 5:
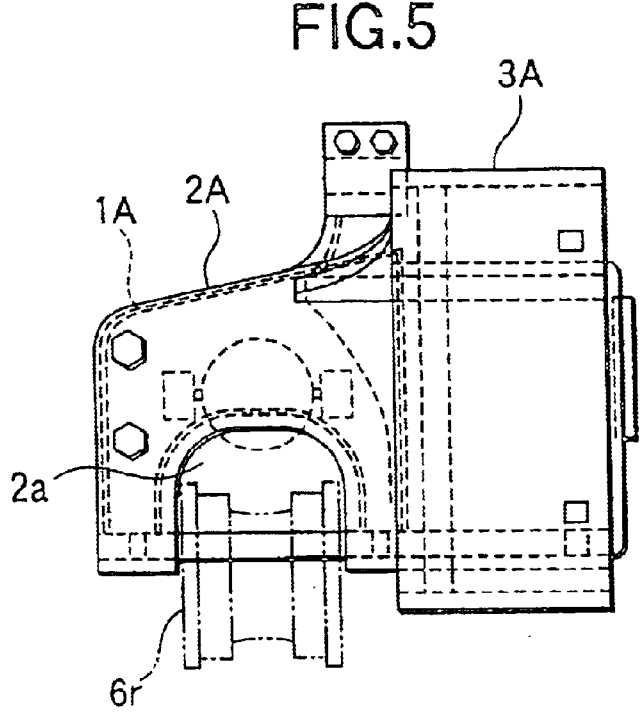
FIG. 5 is a view as seen from an arrow Y in FIG. 4.
Figure 6:
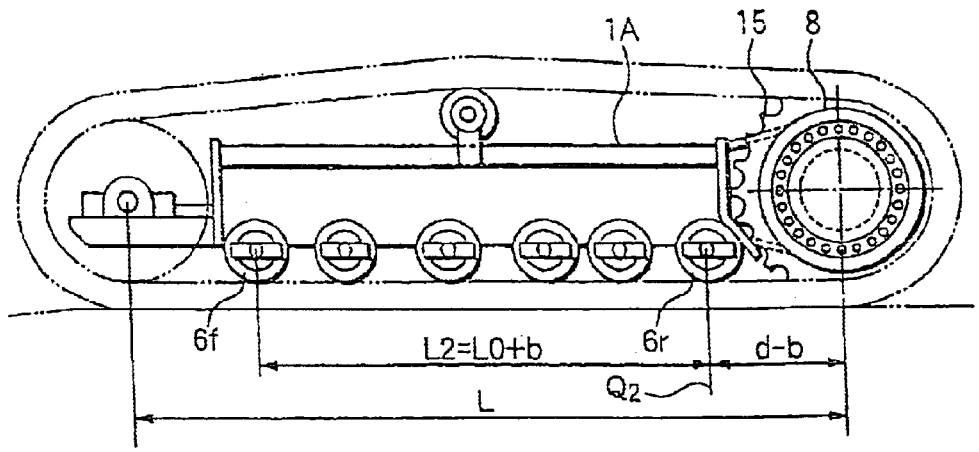
FIG. 6 is a side elevational view of a traveling apparatus in accordance with the second embodiment.

Next, a description will be given of a second embodiment with reference to FIGS. 4 to 6. FIG. 4 is a schematic view of a main portion of the invention in accordance with the present embodiment, which shows a rear end portion of the track frame 1. FIG. 5 is a view as seen from an arrow Y in FIG. 4, and FIG. 6 is a side elevational view of a traveling apparatus in accordance with the present embodiment.

The second embodiment is structured such that a lower side plate portion of a joint plate 2A is bent to a crawler drive wheel side, a rear end side of a bottom surface in a track frame is made longer toward the crawler drive wheel side so as to make it possible to move a mounting position of the track roller bearing mounted to a lower surface in a rearmost end side of the track frame, and a notch to which the roller portion of the tack roller in the rearmost end side of the track frame is inserted is formed in the bent plate portion of the joint plate 2A. The other structures are the same as those of the first embodiment, and a description thereof will be omitted here.

Next, a description will be given of an operation and an effect of the second embodiment with reference to FIGS. 4 to 6.

As shown in FIGS. 4 and 5, it is possible to extend the lower surface in the rear end side of the track frame 1A toward the crawler drive wheel side by bending the lower side plate portion of the joint plate 2A to the crawler drive wheel side. Further, by forming a notch portion 2a to which the roller portion of the track roller 6r in the rearmost end side of the track frame is inserted, in this bent plate portion, it is possible to avoid an interference between the roller portion of the track roller 6r in the rearmost end side of the track frame and the bent plate portion of the joint plate, whereby it is possible to move a mounting position of a track roller bearing 16 in the rearmost end side to the lower surface in the rear end side of the elongated track frame and it is possible to mount the track roller 6r in the rearmost end side further close to the crawler drive wheel side in comparison with the case of the first embodiment.

At this time, the track roller 6r in the rearmost end side can be moved to a position having at least a predetermined gap g3 between an outer diameter D of the track roller 6r in the rearmost end side and an outer periphery of the drive wheel 15 so as to be arranged close to the crawler drive wheel side.

Accordingly, the track roller 6r in the rearmost end side is arranged close to the crawler drive wheel side at a length b (in this case, b>a) from a center Q0 of the rotary bearing of the conventional rearmost end side track roller 6r. Therefore, with respect to a distance d between the center Q0 of the rotary bearing of the rearmost end track roller 6r and the center P of rotation of the crawler drive wheel in accordance with the conventional art shown in FIG. 7, a distance between the center Q1 of the rotary bearing of the rearmost end track roller 6r and the center P of rotation of the crawler drive wheel in accordance with the present embodiment is obtained by the formula d-b, so that the length b can be reduced.

Accordingly, as shown in FIG. 6, since the crawler actual ground contact length from the center of the rotary bearing of the track roller 6f in the frontmost end side of the track frame to the center Q2 of the rotary bearing of the track roller 6r in the rearmost end side of the track frame is obtained by the formula L2=(L0+b), and the relation b>a is established, it is possible to increase the length of the crawler actual ground contact length in the hydraulic drive type crawler traveling apparatus in comparison with the first embodiment, whereby it is possible to improve a stability and a ground leveling operability at a time of traveling and working.

As described above, in accordance with the present invention, the following effects can be obtained.

In the track frame structure in which the mounting frame assembly of the crawler drive reduction gear with the hydraulic motor is mounted to the end portion of the track frame 1 of the crawler-type construction machine via the joint plate 2, since the notch portion notched so as to have the size of the roller portion of the track roller is provided in the lower side plate portion of the joint plate facing to the track roller mounted to the rearmost end side of the track frame, and the roller portion of the track roller is inserted and mounted within the notch portion, it is possible to arrange the track roller in the rearmost end side close to the crawler drive wheel side.

Accordingly, it is possible to increase the crawler actual ground contact length in the hydraulic drive type crawler traveling apparatus, and it is possible to improve the stability and the ground leveling operability at a time of traveling and working.

Further, by bending the lower side plate portion having the notch portion in the joint plate to the crawler drive wheel side, since it is possible to extend the length of the lower surface in the rear end side of the track frame toward the crawler drive wheel side and it is possible to move the mounting position of the rotary bearing of the track roller in the rearmost end side further close to the crawler drive wheel side, it is possible to increase the crawler actual ground contact length and it is possible to further improve the stability and the ground leveling operability of the vehicle.

What is claimed is:

1. A track frame structure in which a mounting frame assembly of a crawler drive reduction gear with a hydraulic motor is mounted to an end portion of a track frame of a crawler-type construction machine via a joint plate, wherein a notch portion notched so as to have a size to which a roller portion of a track roller is inserted, is provided in a lower side portion of said joint plate, and the roller portion of the track roller mounted to a rearmost end side of the track frame is inserted and mounted within said notch portion, whereby the track roller in the rearmost end side of the track frame can be arranged close to a crawler drive wheel side.

2. A track frame structure in which a mounting frame assembly of a crawler drive reduction gear with a hydraulic motor is mounted to an end portion of a track frame of a crawler-type construction machine via a bent joint plate, wherein a notch portion notched so as to have a size to which a roller portion of a track roller is inserted, is provided in a lower side portion of said bent joint plate, and the roller portion of the track roller mounted to a rearmost end side of the track frame is inserted and mounted within said notch portion, whereby the track roller in the rearmost end side of the track frame can be arranged close to a crawler drive wheel side and wherein the lower side portion having the notch portion notched so as to have the size to which the roller portion of the track roller is inserted in said bend joint plate formed by bending a bent side of said bent joint plate to a side of the crawler drive wheel, the roller portion of the track roller mounted to the rearmost end side of the track frame is inserted within said notch portion, and a rotary shaft receiving portion of said track roller is mounted close to said bent side of said bent joint plate, whereby the track roller in the rearmost end side of the track frame can be arranged close to the crawler drive wheel side.

* * * * *